United States Patent [19]
Itoh et al.

[11] Patent Number: 5,835,175
[45] Date of Patent: Nov. 10, 1998

[54] LIQUID CRYSTAL DISPLAY APPARATUS

[75] Inventors: Osamu Itoh, Hitachi; Katsumi Kondo, Hitachinaka; Junichi Hirakata, Mobara; Yuka Utsumi, Hitachi; Naoki Kikuchi, Mobara; Yoshiaki Nakamura, Mobara, all of Japan

[73] Assignees: Hitachi, Ltd., Tokyo; Hitachi Device Engineering, Co. Ltd., Mobara, both of Japan

[21] Appl. No.: 583,658

[22] Filed: Jan. 5, 1996

[30]    Foreign Application Priority Data

Jan. 20, 1995   [JP]   Japan ................................ 7-006935

[51] Int. Cl.⁶ ................................................. G02F 1/1335
[52] U.S. Cl. ........................................... 349/119; 349/121
[58] Field of Search ........................................ 349/119, 121

[56]              References Cited

U.S. PATENT DOCUMENTS

| | | | |
|---|---|---|---|
| 4,844,569 | 7/1989 | Wada et al. | 349/119 |
| 4,909,606 | 3/1990 | Wada et al. | 349/119 |
| 4,984,874 | 1/1991 | Yamamoto et al. | 349/119 |
| 5,126,866 | 6/1992 | Yoshimizu et al. | 349/119 |
| 5,179,458 | 1/1993 | Fukui | 349/119 |
| 5,194,975 | 3/1993 | Akatsuka et al. | 349/119 |
| 5,212,819 | 5/1993 | Wada | 349/119 |
| 5,237,438 | 8/1993 | Miyashita | 349/119 |
| 5,303,075 | 4/1994 | Wada et al. | 349/119 |
| 5,343,317 | 8/1994 | Wada et al. | 349/119 |
| 5,369,513 | 11/1994 | Akatsuka et al. | 349/119 |
| 5,406,396 | 4/1995 | Akatsuka et al. | 349/119 |
| 5,448,386 | 9/1995 | Watanabe et al. | 349/119 |
| 5,650,833 | 7/1997 | Akatsuka et al. | 349/119 |

*Primary Examiner*—William L. Sikes
*Assistant Examiner*—James D. Dudek
*Attorney, Agent, or Firm*—Antonelli, Terry, Stout & Kraus, LLP

[57]              ABSTRACT

A color STN-LCD having preferable display quality and decreased manufacturing cost uses a liquid crystal display apparatus which includes a liquid crystal layer having a twist angle in a range from 200° and less than 360°, a retardation of the liquid crystal layer in a range of 0.80 μm~0.90 μm, an azimuth of transmittance axis of the upper polarizer in a range of 30°~70°, an azimuth of the transmittance axis of the lower polarizer in a range of 60°~90°, an azimuth of the slow axis of the upper phase plate in a range of 150°~190°, an azimuth of the slow axis of the lower phase plate in a range of 30°~80°, a retardation of the upper phase plate at a wave length of 550 nm in a range of 200 nm~300 nm, and a retardation of the lower phase plate at a wave length of 550 nm in a range of 500 nm~620 nm.

7 Claims, 3 Drawing Sheets

LIQUID CRYSTAL DISPLAY APPARATUS

BACKGROUND OF THE INVENTION

The present invention relates to super twisted nematic liquid crystal display apparatus (STN-LCD), especially to color STN-LCD.

The low display quality of a color STN-LCD is caused by an unevenness of the facing planes of the substrate provided with the color filters. On account of this unevenness, the orientation treatment is not performed uniformly, and the thickness of the liquid crystal molecule layer does not become uniform. Therefore, the STN-LCD has steep transmittance-voltage characteristics, which causes a non-uniform display. In order to reduce or eliminate the non-uniformity of the display, the contrast ratio must be decreased.

In order to decrease the unevenness of the facing planes of the substrate provided with color filters, various counter-measures have been proposed, such as increasing the thickness of the flattening layer, polishing the facing surface of the substrates, and other measures. However, these counter-measures not only did not achieve remarkable advantages, resulted in a significant increase in the number of production steps. On the other hand, a method for manufacturing flat color filters (electrode-position method) has been developed. However, the cost of this manufacturing method remains as a problem to be solved in future.

JP-A-5-107520 (1993) describes a liquid crystal display apparatus wherein a product (retardation) of the thickness of the liquid crystal layer and the birefringence was set in a range of 0.75 $\mu$m–1.0 $\mu$m, the twist angle was set in a range of 210°–270°, upper and lower polarizers and phase plates were used, and retardation of the phase plate was set in a range of 200 nm–450 nm. In accordance with the disclosed liquid crystal display apparatus, a positive contrast display which operates in a dark state by applying a higher voltage could be achieved. However, a sufficiently desirable display quality was not obtained.

SUMMARY OF THE INVENTION

One of the objects of the present invention is to provide a low cost color display STN-LCD having a high display quality, that is, a STN-LCD in which a nonuniform color display, which has been a problem to be solved with the color STN-LCD of the prior art, is eliminated.

With the liquid crystal display apparatus of the present invention, the twist angle of the liquid crystal layers was set at least at 200°, the retardation of the liquid crystal layer was set in a range of 0.80 $\mu$m–0.90 $\mu$m, the azimuth of the transmittance axis of the upper polarizer was set in a range of 30°–70°, the azimuth of the transmittance axis of the lower polarizer was set in a range of 60°–90°, the azimuth of the slow axis of the upper phase plate was set in a range of 150°–190°, the azimuth of the slow axis of the lower phase plate was set in a range of 30°–80°, the retardation of the upper phase plate at a wave length of 550 nm was set in a range of 200 nm–300 nm, and the retardation of the lower phase plate at a wave length of 550 nm was set in a range of 500 nm–620 nm.

Preferably, the retardation of the liquid crystal layer is set in a range of 0.84 $\mu$m–0.88 $\mu$m, the azimuth of the transmittance axis of the upper polarizer is set in a range of 35°–65°, the azimuth of the transmittance axis of the lower polarizer is set in a range of 65°–85°, the azimuth of slow axis of the upper phase plate is set in a range of 160°–180°, the azimuth of slow axis of the lower phase plate is set in a range of 40°–70°, the retardation of the upper phase plate at a wave length of 550 nm is set in a range of 220 nm–280 nm, and the retardation of the lower phase plate at a wave length of 550 nm is set in a range of 540 nm–600 nm.

Furthermore, preferably, a product of the layer thickness and the birefringence of the liquid crystal layer is set in a range of 0.85 $\mu$m–0.87 $\mu$m, the azimuth of the transmittance axis of the upper polarizer is set in a range of 45°–55°, the azimuth of the transmittance axis of the lower polarizer is set in a range of 70°–80°, the azimuth of the slow axis of the upper phase plate is set in a range of 165°–180°, the azimuth of the slow axis of the lower phase plate is set in a range of 50°–60°, the retardation of the upper phase plate at a wave length of 550 nm is set in a range of 250 nm–270 nm, and the retardation of the lower phase plate at a wave length of 550 nm is set in a range of 540 nm–590 nm.

When the thickness of the liquid crystal layer or the orientation of the liquid crystal molecules is not uniform, the transmittance-voltage characteristics of the liquid crystal layer become non-uniform. As a result, it causes fluctuation of the threshold voltage and non-uniform transmittance in the vicinity of the threshold voltage.

In a case of a negative contrast display, the transmittance for the dark state applied low voltage becomes non-uniform. Because the eyes of a human being are sensitive to fluctuation of the low transmittance, the non-uniformity is recognized remarkably, especially in the case of a negative contrast display. On the contrary, in the case of a positive display, the transmittance for the bright state applied low voltage becomes non-uniform. Because the eyes of a human being are not so sensitive to fluctuation of the high transmittance, the non-uniform transmittance is not recognized remarkably in the case of a negative contrast display. Accordingly, in order to achieve a uniform display with a color STN-LCD, which is subjected to a non-uniformity of the liquid crystal layer in the transmittance-voltage characteristics in accordance with any unevenness of the color filters, the positive contrast display must be selected.

Furthermore, in order to perform color display with preferable hue in all gradations, the hue in respective gradient states must be made colorless in addition to making the hue in the bright state colorless.

One of the setting conditions of the polarizer is the azimuth of the transmittance axis. The azimuth of the slow axis and the retardation at 550 nm are setting conditions for the phase plate. Here, the slow axis refers to an axis corresponding to a higher refractive index in two optical axes in the plane of the phase plate. The azimuth is defined as an angle measured counter-clockwise from a direction of 0° or horizontal direction, which horizontal direction divides equally the angle formed bewteen the respective orientation treatment directions A and B of the upper and the lower orientation layers, as shown in FIG. 2.

In accordance with the setting of the optical conditions as proposed by the present invention, a positive contrast display with a colorless hue at a bright state and respective gradient states can be obtained with a preferable contrast ratio.

Light leakage from non-electrode portions is a problem in a positive contrast display, because the non-electrode portions have a transmittance of the same degree as that of the bright state. By providing a black matrix to cover the non-electrode portions, the light leakage from the non-electrode portions can be suppressed, and a display having a preferable contrast ratio can be obtained even in a case when plural pixels are observed simultaneously.

The switching of a pixel in a multiplex driving operation is achieved by a signal voltage applied during a scanning time, and the applied voltage during the scanning time is at least 10 times that of the applied voltage in a non-scanning time. When the response of the liquid crystal layer is remarkably slow, the orientation of the liquid crystal molecules can not follow the time sequence of the applied voltage, but the orientation of the liquid crystal molecules is determined by an effective value of the applied voltage. On the contrary, when the response of the liquid crystal layer is remarkably fast, the orientation of the liquid crystal molecules will follow the time sequence of the applied voltage (frame response), and the orientation of liquid crystal molecules is not determined by the effective value of the applied voltage. In this case, the liquid crystal molecules can not maintain their orientation in one frame time (a time between pulses) even if the effective value of the applied voltage is larger than the threshold voltage. Accordingly, the contrast ratio decreases. Because the normally open display presents a dark state in the higher voltage area, increasing transmittance of the dark state by the frame response is large, and a decrease of the contrast ratio is readily produced.

A response time of about 300 ms is necessary for the operation of pointing devices. However, in a positive contrast display, the contrast ratio decreases remarkably due to the frame response even if the response time is 300 ms.

A decrease of the contrast ratio can be prevented by making one frame time short, so as to apply a subsequent signal voltage while the liquid crystal molecules maintains the transmittance-voltage condition. In order to evaluate the effects of the frame response in the color display, a parameter explained hereinafter is introduced.

A color STN-LCD with 512 colors using 8 gradations is postulated. Among the three primary colors of RGB (red, green, and blue), B has the lowest transmittance. Therefore, a ratio T(blue)/T(black) of the transmittance T(blue) which is displayed by the second gradation counted from the lowest transmittance in the 8 gradations and a transmittance T(black) of black state is used as the evaluation parameter.

FIG. 3 illustrates a relationship between the frame frequency (inverse number of one frame time) and the ratio T(blue)/T(black), determined under a bias ratio in a practical range. The white dots and the black dots in FIG. 3 indicate, respectively, the cases when the bias ratio was 13:1 and 10:1. The contrast ratio in FIG. 3 was measured from transmission light in a region of about 10 pixels of a color STN-LCD provided with a black matrix. The number of scanning electrodes in the liquid crystal display device was 240, and the contrast ratio was 40:1 when the scanning electrodes were driven by a 1 kHz rectangular wave. If the ratio T(blue)/T(black) is equal to or more than 2:1, the B displayed by the second gradation and the black display can be distinguished each other clearly. A ratio T(blue)/T(black) equal to or more than 2:1 could be obtained with a frequency equal to or greater than 120 Hz, when the bias ratio was 10, and with a frequency equal to or greater than 130 Hz, when the bias ratio was 13.

Accordingly, a practically sufficient color display can be obtained with a frame frequency equal to or greater than 120 Hz.

BRIEF DESCRIPTION OF THE DRAWINGS

These and other objects, features, and advantages of the present invention will be understood more clearly from the following detailed description with reference to the accompanying drawings, wherein.

DESCRIPTION OF THE PREFERRED EMBODIMENTS (EMBODIMENT 1)

Figure 1:
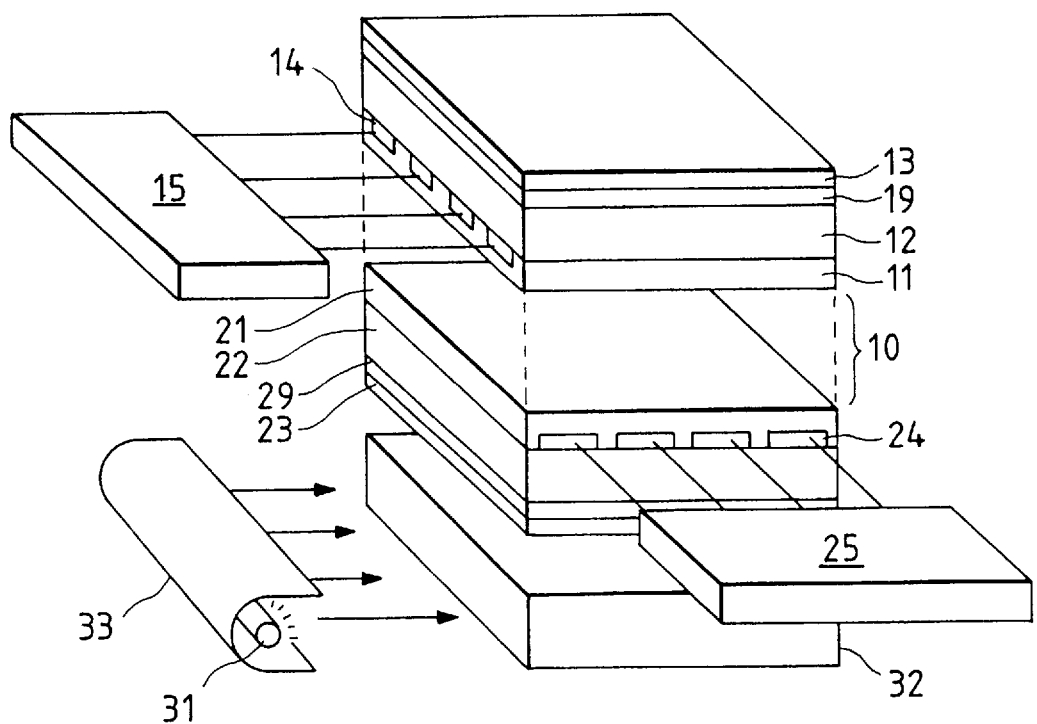
FIG. 1 is a perspective view of a liquid crystal display apparatus relating to the present invention.
Figure 2:
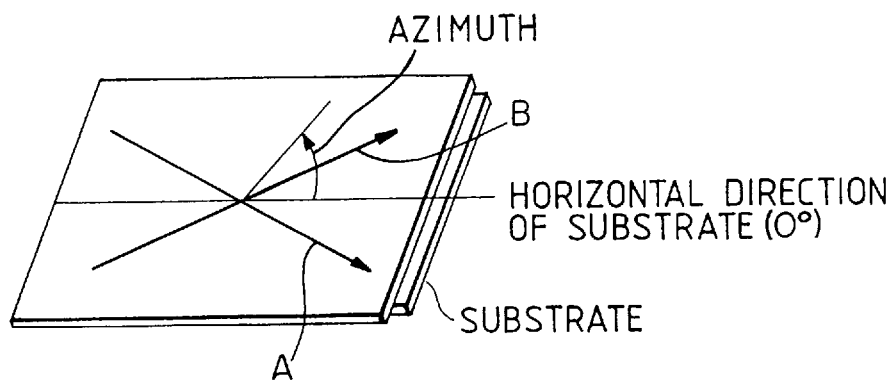
FIG. 2 is a diagram for explaining a definition of an azimuth in accordance with the present invention.
Figure 3:
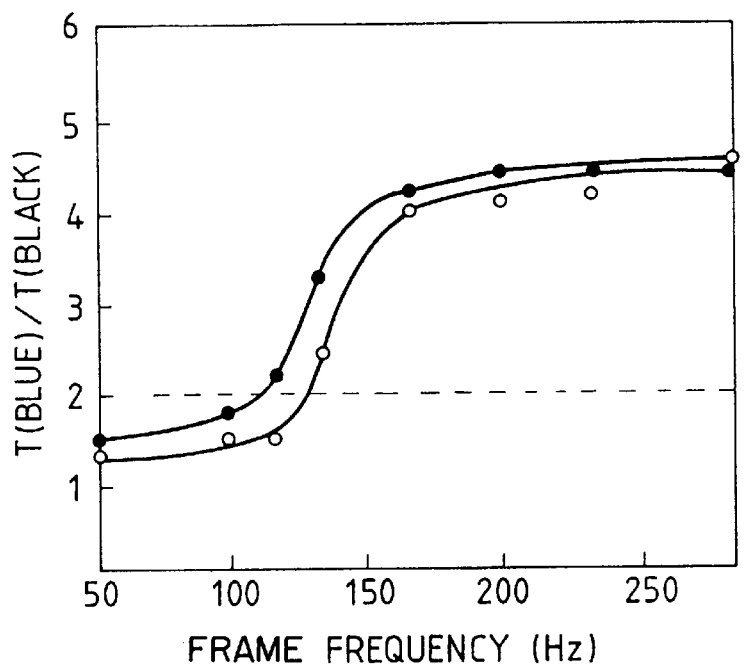
FIG. 3 is a graph indicating the dependency of a ratio T(blue)/T(black) on frame frequencies.

FIG. 1 indicates the composition of the liquid crystal display apparatus of the present invention. The upper and lower substrates 12, 22 hold xy electrodes 14, 24, orientation layers 11, 21, and a liquid crystal layer 10. The xy electrodes 14, 24 on the upper and the lower substrates are connected to driving circuits 15, 25. At the outer surfaces of the upper and the lower substrates, an upper phase plate 19, a lower phase plate 29, an upper polarizer 13, and a lower polarizer 23 are placed. At an even lower portion of the lower substrate, a light source 31, a light guide plate 32, a reflector 33 are provided.

The upper and the lower substrates are made of glass, and the xy electrode 14, 24 is made of ITO (Indium Tin Oxide). The orientation layer was made of polyimide group polymers, and an orientation treatment was performed by a rubbing method. A pretilt angle was set as 4°. A twist angle was set as 240°. The liquid crystal layer 10 was composed of a nematic liquid crystal and chiral dopant, wherein the thickness d of the layer was 6.2 μm, the liquid crystal material was a mixture of HR2038, HR2047 (both made by Rhodic Co.), and S811 (made by Merck Co.), of which the respective mixing ratio was 75.59%, 23.55%, and 0.86% by weight, and !!!0dbI n was 0.138, and Δnd was 0.855 μm. Polymer beads were spread between the substrates so as to keep the thickness of the liquid crystal layer uniform. The polarizers were G1220DU (made by Nitto Denko Co.), and the phase plates were NRF (made by Nitto Denko Co.) made of polycarbonate.

The azimuth of the transmittance axis through the lower polarizer was set as 65°, the azimuth of the transmittance axis of the upper polarizer was set as 45°, the azimuth of the slow axis of the lower phase plate was set as 45°, Δnd at 550 nm was set at 0.60 μm, the azimuth of the slow axis of the upper phase plate was set as 180°, and Δnd at 550 nm was set at 0.27 μm. Display characteristics of the liquid crystal display device (a liquid crystal display apparatus other than the driving circuit) of the liquid crystal display apparatus, manufactured as explained above, were measured. The focus of the measurement was selected as a portion having a pixel where the beads were not located, and rectangular waves of 1 kHz were used. A positive contrast display which produces a bright state by applying a low voltage was obtained, wherein the applied voltages of the bright state and the dark state were, respectively, 2.18 V and 2.33 V. The contrast ratio was 62:1, and the transmittance of the bright state and the dark state were, respectively, 26% and 0.42%.

The display condition was observed by connecting the display to a driving circuit. The brightness was uniform all over the display in the bright state, the dark state, and respective gradations, a decrease of the brightness in the bright state was small even when the display was observed in a direction oblique to a direction perpendicular to the substrate plane, and no reversal of the bright state and the dark state occurred.

(EMBODIMENT 2)

With the liquid crystal display apparatus used in the embodiment 1, the azimuth of the transmittance axis through the lower polarizer was set as 70°, the azimuth of the transmittance axis of the upper polarizer was set as 55°, the azimuth of the slow axis of the lower phase plate was set as 50°, Δnd at a wave length of 550 nm was set at 0.59 μm, the azimuth of the slow axis of the upper phase plate was set as 165°, and Δnd at a wave length of 550 nm was set at 0.25 μm.

A positive contrast display which produces a bright state by applying a low voltage was obtained, wherein the applied voltages of the bright state and the dark state were, respectively, 2.18 V and 2.33 V. The contrast ratio was 96:1, and the transmittance of the bright state and the dark state were, respectively, 27% and 0.28%.

The brightness was uniform all over the display in the bright state, the dark state, and respective gradations, the decrease in brightness in the bright state was small even when the display was observed in a direction oblique to a direction perpendicular to the substrate plane, and no reversal of the bright state nor the dark state occurred.

(EMBODIMENT 3)

With the liquid crystal display apparatus used in the embodiment 1, the azimuth of the transmittance axis through the lower polarizer was set as 75°, the azimuth of the transmittance axis of the upper polarizer was set as 0°, the azimuth of the slow axis of the lower phase plate was set as 130°, Δnd at a wave length of 550 nm was set at 0.34 μm, the azimuth of the slow axis of the upper phase plate was set as 105°, and Δnd at a wave length of 550 nm was set at 0.50 μm.

A positive contrast display which produces a bright state by applying a low voltage was obtained, wherein the applied voltages of the bright state and the dark state were, respectively, 2.18 V and 2.33 V. The contrast ratio was 192:1, and the transmittance of the bright state and the dark state were, respectively, 27% and 0.14%.

The brightness was uniform all over the display in the bright state, the dark state, and respective gradations, the decrease in brightness in the bright state was small even when the display was observed in a direction oblique to a direction perpendicular to the substrate plane, and no reversal of the bright state and the dark state occurred.

(EMBODIMENT 4)

With the liquid crystal display apparatus used in the embodiment 1, the substrate was replaced with a substrate provided with a black matrix. The black matrix was composed of pigment, and the pigment was distributed so as to cover all the non-electrode portions where a pair of matrix electrodes did not intersect each other. The black matrix was formed on the facing substrates to be about 1 μm thick using a pigment dispersion method, and a flattening film was formed thereon in order to reduce any unevenness caused by the black matrix. The xy electrodes were formed on the flattening film.

The display characteristics were observed by connecting the apparatus to a driving circuit. The frame frequency of the driving circuit was set at 60 Hz, and the bias ratio was set as 13:1. The observed region was about ten pixels. The contrast ratio was 10:1, and the transmittance of the bright state and the dark state were, respectively, 25% and 2.4%.

The brightness was uniform all over the display in the bright state, the dark state, and respective gradations, the decrease in brightness in the bright state was small even when the display was observed in a direction oblique to a direction perpendicular to the substrate plane, and no reversal of the bright state and the dark state occurred.

(EMBODIMENT 5)

With the liquid crystal display apparatus used in the embodiment 4, the black matrix was composed of chromium.

The display characteristics were observed by connecting the apparatus to a driving circuit. The frame frequency of the driving circuit was set at 60 Hz, and bias ratio was set as 13:1. The observed region was about ten pixels. The contrast ratio was 11:1, and the transmittance of the bright state and the dark state were, respectively, 25% and 2.2%.

The brightness was uniform all over the display in the bright state, the dark state, and respective gradations, the decrease in brightness in the bright state was small even when the display was observed in a direction oblique to a direction perpendicular to the substrate plane, and no reversal of the bright state and the dark state occurred.

(EMBODIMENT 6)

The display characteristics of the liquid crystal display apparatus used in the embodiment 5 were observed by connecting the apparatus to a driving circuit. The frame frequency of the driving circuit was set at 150 Hz, and the bias ratio was set as 13:1. The observed region was about ten pixels. The contrast ratio was 23:1, and the transmittance of the bright state and the dark state were, respectively, 25% and 1.1%.

The brightness was uniform all over the display in the bright state, the dark state, and respective gradations, the decrease in brightness in the bright state was small even when the display was observed in a direction oblique to a direction perpendicular to the substrate plane, and no reversal of the bright state and the dark state occurred.

As explained above, light leakage from the non-electrode portion was interrupted using a black matrix made of chromium, the frame response was suppressed by making the frame frequency 150 Hz, and the contrast ratio was increased to a value sufficient for practical use.

(EMBODIMENT 7)

With the liquid crystal display apparatus used in the embodiment 2, the substrate was replaced with a substrate provided with a black matrix made of chromium.

The display characteristics were observed by connecting the apparatus to a driving circuit. The frame frequency of the driving circuit was set at 150 Hz, and the bias ratio was set as 13:1. The observed region was about ten pixels. The contrast ratio was 23:1, and the transmittance of the bright state and the dark state were, respectively, 25% and 1.1%.

The brightness was uniform all over the display in the bright state, the dark state, and respective gradations, the decrease in brightness in the bright state was small even when the display was observed in a direction oblique to a direction perpendicular to the substrate plane, and no reversal of the bright state and the dark state occurred.

(EMBODIMENT 8)

With the liquid crystal display apparatus used in the embodiment 3, the substrate was replaced with a substrate provided with a black matrix made of chromium.

The display characteristics were observed by connecting the apparatus to a driving circuit. The frame frequency of the driving circuit was set at 150 Hz, and the bias ratio was set as 13:1. The observed region was about ten pixels. The contrast ratio was 31:1, and the transmittance of the bright state and the dark state were, respectively, 25% and 0.8%.

The brightness was uniform all over the display in the bright state, the dark state, and respective gradations, the decrease in brightness in the bright state was small even when the display was observed in a direction oblique to a direction perpendicular to the substrate plane, and no reversal of the bright state and the dark state occurred.

(EMBODIMENT 9)

With the liquid crystal display apparatus used in the embodiment 1, the substrate was replaced with a substrate provided with a black matrix composed of color filters and chromium.

The color filters were manufactured by a pigment dispersion method, corresponding to display colors of red, blue, and green, and the average thickness of the liquid crystal layers of the respective color display pixels was 6.25 μm, 6.30 μm, and 6.20 μm for red, blue, and green, respectively.

The display characteristics were observed by connecting the apparatus to a driving circuit. The frame frequency of the driving circuit was set at 150 Hz, and the bias ratio was set as 13:1. The observed region was about ten pixels. The contrast ratio was 24:1, and the transmittance of the bright state and the dark state were, respectively, 5.5% and 0.23%.

The brightness was uniform all over the display in the bright state, for respective colors, and in the dark state notwithstanding the fact that there was about a 0.1 μm fluctuation in thickness of the respective liquid crystal layers in the display pixels of the respective colors. Furthermore, the decrease in brightness in the bright state was small even when the display was observed in a direction oblique to a direction perpendicular to the substrate plane, and no reversal of the bright state and the dark state occurred.

As explained above, light leakage from the non-electrode portions was interrupted by using a black matrix made of chromium, the frame response was suppressed by making the frame frequency 150 Hz, and a uniform display was obtained by selecting a normally open display notwithstanding the presence of fluctuation in the liquid crystal layer thickness of the display pixels of the respective colors.

(EMBODIMENT 10)

With the liquid crystal display apparatus used in the embodiment 2, the substrate was replaced with a substrate provided with a black matrix composed of color filters and chromium.

The color filters were manufactured by a pigment dispersion method, corresponding to display colors of red, blue, and green, and the average thickness of the liquid crystal layers of the respective color display pixels was 6.25 μm, 6.30 μm, and 6.20 μm for red, blue, and green, respectively.

The display characteristics were observed by connecting the apparatus to a driving circuit. The frame frequency of the driving circuit was set at 150 Hz, and the bias ratio was set as 13:1. The observed region was about ten pixels. The contrast ratio was 28:1, and the transmittance of the bright state and the dark state were, respectively, 5.6% and 0.20%.

The brightness was uniform all over the display in the bright state, for respective colors, and in the dark state notwithstanding the fact that there was about a 0.1 μm fluctuation in thickness of the respective liquid crystal layers in the display pixels of respective colors. Furthermore, the decrease in brightness in the bright state was small even when the display was observed in a direction oblique to a direction perpendicular to the substrate plane, and no reversal of the bright state and the dark state occurred.

(EMBODIMENT 11)

With the liquid crystal display apparatus used in the embodiment 3, the substrate was replaced with a substrate provided with a black matrix composed of color filters and chromium.

The color filters were manufactured by a pigment dispersion method, corresponding to display colors of red, blue, and green, and the average thickness of the liquid crystal layers of the respective color display pixels was 6.25 μm, 6.30 μm, and 6.20 μm for red, blue, and green, respectively.

The display characteristics were observed by connecting the apparatus to a driving circuit. The frame frequency of the driving circuit was set at 150 Hz, and the bias ratio was set as 13:1. The observed region was about ten pixels. The contrast ratio was 34:1, and the transmittance of the bright state and the dark state were, respectively, 5.7% and 0.17%.

The brightness was uniform all over the display in the bright state, for respective colors, and in the dark state notwithstanding the fact that there was about a 0.1 μm fluctuation in thickness of the respective liquid crystal layers in the display pixels of respective colors. Furthermore, the decrease in brightness in the bright state was small even when the display was observed in a direction oblique to a direction perpendicular to the substrate plane, and no reversal of the bright state and the dark state occurred.

(EMBODIMENT 12)

Figure 4:
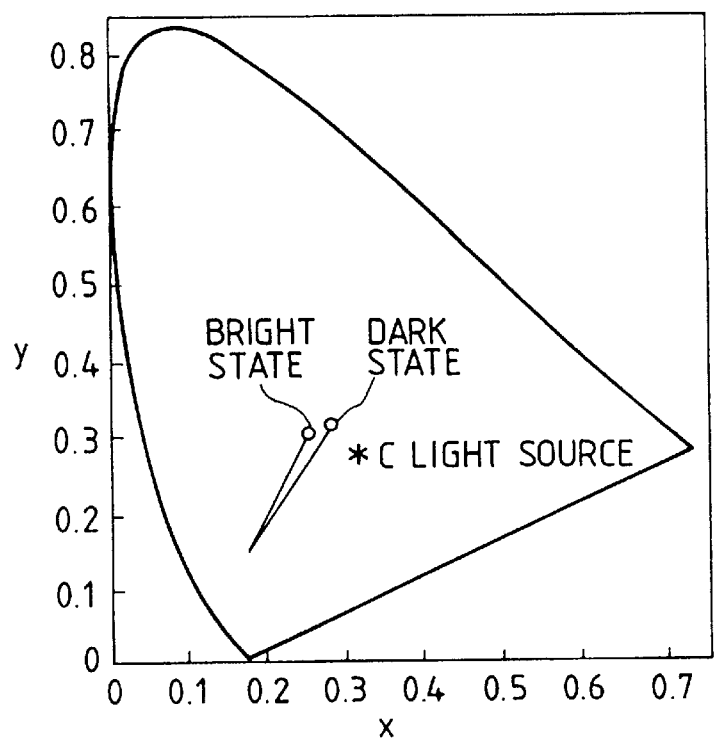
FIG. 4 is a graph indicating alteration of displayed color at a white display between a bright state and a dark state in the liquid crystal display apparatus relating to the present invention.

The display characteristics of the liquid crystal display apparatus used in the embodiment 11 were observed by connecting the apparatus to a driving circuit. The frame frequency of the driving circuit was set at 150 Hz, and the bias ratio was set as 10:1. The observed region was about ten pixels. The contrast ratio was 38:1, and the transmittance of the bright state and the dark state were, respectively, 5.7% and 0.15%. The ratio T(blue)/T(black) became 2.5, and the respective colors were clearly distinguishable. The dependence of displayed colors between the bright state and the dark state on the applied voltage was evaluated on a chromaticity coordinate. The result of the evaluation is indicated in FIG. 4. Changes in displayed colors between the bright state and the dark state are small, and the color temperature was higher than that of the C light source. By using a back light whose color temperature was lower than that of the C light source, colorless white was obtained through all gradations.

The brightness was uniform all over the display in the bright state, for respective colors, and in the dark state notwithstanding the fact that there was about a 0.1 μm fluctuation in thickness of the respective liquid crystal layers in the display pixels of respective colors. Furthermore, the decrease in brightness in the bright state was small even when the display was observed in a direction oblique to a direction perpendicular to the substrate plane, and no reversal of the bright state and the dark state occurred.

Figure 5:
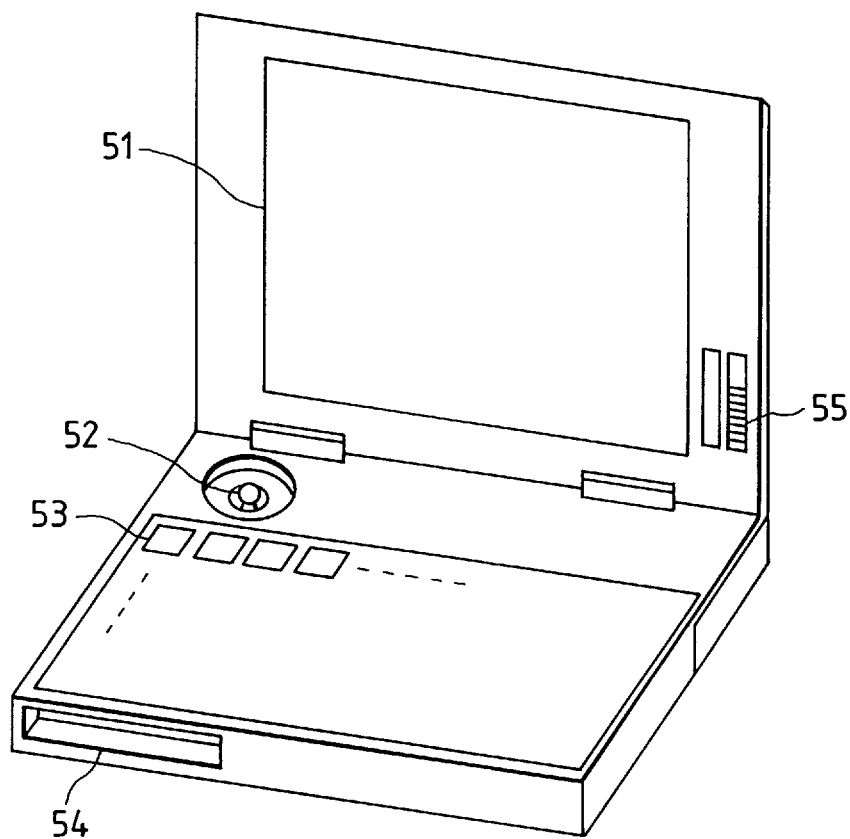
FIG. 5 is a perspective view of a note book type personal computer provided with the liquid crystal display apparatus relating to the present invention.

A perspective view of a note book type personal computer provided with the liquid crystal display apparatus according to the present invention is illustrated in FIG. 5. The reference numeral 51 denotes a display, 52 denotes a pointing device, 53 denotes a key board, 54 denotes a disk drive, and 55 denotes a device for adjusting the applied voltage.

(COMPARATIVE EXAMPLE 1)

With the liquid crystal display apparatus used in the embodiment 11, the conditions of the phase plate and the polarizer were changed, and a negative contrast display was obtained. The phase plate was not placed at a lower portion of the facing substrates, but two phase plates were placed only at an upper portion of the facing substrates. The azimuth of the transmittance axis through the lower polarizer was set as 75°, the azimuth of the slow axis of the lower phase plate was set as 35°, Δnd at 550 nm was set at 0.38 μm, the azimuth of the slow axis of the upper phase plate was set as 65°, and Δnd at 550 nm was set at 0.38 μm.

Display characteristics of the liquid crystal display device of the liquid crystal display apparatus manufactured as above explained were determined. An area for the measurement was selected as a portion having a pixel where the beads were not located, and rectangular waves of 1 kHz. were used. A negative contrast display, which produces a dark state by applying low voltage, was obtained, wherein the applied voltages of the dark state and the bright state were, respectively, 2.19 V and 2.34 V. The contrast ratio was 119:1, and the transmittance of the bright state and the dark state were, respectively, 25% and 0.21%.

The display condition was observed by connecting the apparatus to a driving circuit. The frame frequency of the driving circuit was set at 60 Hz, and the bias ratio was set as 13:1. The observed region was about ten pixels. The contrast ratio was 36:1, and the transmittance of the bright state and the dark state were, respectively, 5.1% and 0.14%.

The bright state and respective colors were produced on the whole display and their conditions were observed. As a result, a remarkable non-uniformity in colors was observed. Especially, the non-uniformity was remarkable when the whole display was in a dark state. When the display was observed in a direction oblique to a direction perpendicular to the substrate plane, the decrease of brightness in the bright state was significant, and a reversal of the bright state and the dark state occurred. As explained above, the normally close state could provide a preferable contrast ratio, but the uniformity was not satisfactory, especially in the dark state, fluctuation of the transmittance-voltage characteristics of the liquid crystal layer caused by unevenness of the color filters became apparent, and the uniformity of the display became worse. Furthermore, the viewing angle characteristics were also not preferable, and a reversal of the bright state and the dark state occurred when the display was observed from an oblique direction.

(COMPARATIVE EXAMPLE 2)

With the liquid crystal display apparatus of the comparative example 1, the frame frequency of the driving circuit was set at 160 Hz, and the bias ratio was set as 10:1. The observed region was about ten pixels, and the display characteristics were observed. The contrast ratio was 42:1, and the transmittance of the bright state and the dark state were, respectively, 5.0% and 0.12%.

The bright state and respective colors were produced on the whole display and their conditions were observed. As a result, a remarkable non-uniformity in colors was observed. Especially, the non-uniformity was remarkable when the dark state was produced on the whole display. When the display was observed in a direction oblique to a direction perpendicular to the substrate plane, the brightness in the bright state decreased significantly, and a reversal of the bright state and the dark state occurred. As explained above, the uniformity of the display and the viewing angle characteristics can not be improved with a negative contrast display even when the frame frequency of the driving circuit and the bias ratio are changed.

What is claimed is:

1. A liquid crystal display apparatus, comprising:
    a pair of spaced substrates including an upper substrate and a lower substrate;
    a liquid crystal layer disposed between said substrates;
    an upper polarizer arranged on one side of said pair of substrates;
    a lower polarizer arranged on the other side of said pair of substrates;
    an upper phase plate arranged between said pair of substrates and the upper polarizer; and
    a lower phase plate arranged between said pair of substrates and the lower polarizer; wherein
    said liquid crystal layer has a twist angle in a range from at least 200° to less than 360°;
    a product of the layer thickness and birefringence of the liquid crystal layer is in a range of 0.80 μm–0.90 μm;
    an azimuth of the transmittance axis of the upper polarizer is in a range of 30°–70°;
    an azimuth of the transmittance axis of the lower polarizer is in a range of 60°–90°;
    an azimuth of the slow axis of the upper phase plate is in a range of 150°–190°;
    an azimuth of the slow axis of the lower phase plate is in a range of 30°–80°;
    the retardation of the upper phase plate at a wave length of 550 nm is in a range of 200 nm–300 nm; and
    the retardation of the lower phase plate at a wave length of 550 nm is in a range of 500 nm–620 nm;
    wherein the azimuth is defined as an angle measured counter-clockwise from a direction of 0°, and which direction of 0° equally divides an angle formed between respective orientation treatment directions of upper and lower orientation layers of the upper and lower substrates.

2. A liquid crystal display apparatus as claimed in claim 1, wherein
    at least one of said substrates of said pair of substrates is provided with a black matrix.

3. A liquid crystal display apparatus as claimed in claim 2, wherein
    said black matrix is arranged at non-intersecting portions of electrodes formed on at least one of said pair of substrates.

4. A liquid crystal display apparatus as claimed in claim 1, wherein
    at least one of said substrates of said pair of substrates is provided with color filters.

5. A liquid crystal display apparatus as claimed in claim 1, wherein
    at least one of said substrates of said pair of substrates is provided with scanning electrodes, and an inverse of the time between scanning pulses applied to said electrodes corresponds to a frequency of at least 120 Hz.

6. A liquid crystal display apparatus, comprising:

a pair of spaced substrates including an upper substrate and a lower substrate;

a liquid crystal layer disposed between said substrates;

an upper polarizer arranged on one side of said pair of substrates;

a lower polarizer arranged on the other side of said pair of substrates;

an upper phase plate arranged between said pair of substrates and the upper polarizer; and a lower phase plate arranged between said pair of substrates and the lower polarizer; wherein said liquid crystal layer has a twist angle in a range from at least 200° to less than 360°;

a product of the layer thickness and birefringence of the liquid crystal layer is in a range of 0.84 $\mu$m–0.88 $\mu$m;

an azimuth of the transmittance axis of the upper polarizer is in a range of 35°–65°;

an azimuth of the transmittance axis of the lower polarizer is in a range of 65°–85°;

an azimuth of the slow axis of the upper phase plate is in a range of 160°–180°;

an azimuth of the slow axis of the lower phase plate is in a range of 40°–70°;

the retardation of the upper phase plate at a wave length of 550 nm is in a range of 220 nm–280 nm; and the retardation of the lower phase plate at a wave length of 550 nm is in a range of 540 nm–600 nm;

wherein the azimuth is defined as an angle measured counter-clockwise from a direction of 0°, and which direction of 0° equally divides an angle formed between respective orientation treatment directions of upper and lower orientation layers of the upper and lower substrates.

7. A liquid crystal display apparatus, comprising:

a pair of spaced substrates including an upper substrate and a lower substrate;

a liquid crystal layer disposed between said substrates;

an upper polarizer arranged on one side of said pair of substrates;

a lower polarizer arranged on the other side of said pair of substrates;

an upper phase plate arranged between said pair of substrates and the upper polarizer; and a lower phase plate arranged between said pair of substrates and the lower polarizer; wherein said liquid crystal layer has a twist angle in a range from at least 200° to less than 360°;

a product of the layer thickness and birefringence of the liquid crystal layer is in a range 0.85 $\mu$m–0.87 $\mu$m;

an azimuth of the transmittance axis of the upper polarizer is in a range of 45°–55°;

an azimuth of the transmittance axis of the lower polarizer is in a range of 70°–80°;

an azimuth of the slow axis of the upper phase plate is in a range of 165°–180°;

an azimuth of the slow axis of the lower phase plate is in a range of 50°–60°;

the retardation of the upper phase plate at a wave length of 550 nm is in a range of 250 nm–270 nm; and the retardation of the lower phase plate at a wave length of 550 nm is in a range of 540 nm–590 nm;

wherein the azimuth is defined as an angle measured counter-clockwise from a direction of 0°, and which direction of 0° equally divides an angle formed between respective orientation treatment directions of upper and lower orientation layers of the upper and lower substrates.

* * * * *